July 25, 1933.  H. W. FLETCHER  1,919,546
METHOD AND APPARATUS FOR TESTING INTERNAL DIAMETER OF TUBES
Filed May 13, 1929
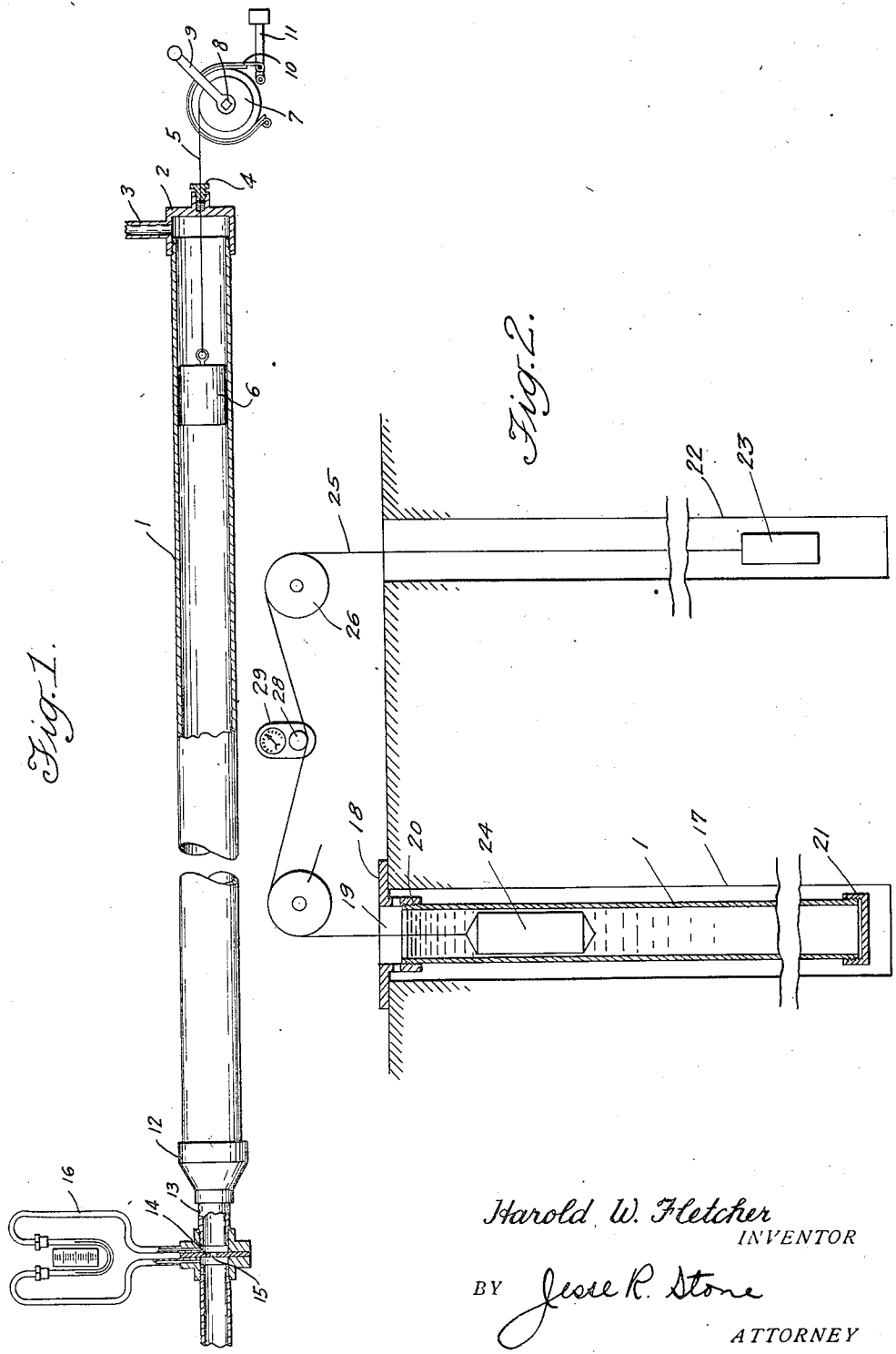
Harold W. Fletcher
INVENTOR
BY Jesse R. Stone
ATTORNEY Patented July 25, 1933

1,919,546

UNITED STATES PATENT OFFICE

HAROLD W. FLETCHER, OF HOUSTON, TEXAS, ASSIGNOR TO HUGHES TOOL COMPANY, OF HOUSTON, TEXAS, A CORPORATION OF TEXAS

METHOD AND APPARATUS FOR TESTING INTERNAL DIAMETER OF TUBES

Application filed May 13, 1929. Serial No. 362,838.

My invention relates to the testing of internal bores of tubular members, such as fluid conducting pipes.

When pipe sections are of material length, as where they are ten feet or more in length, it is difficult to obtain a smooth interior bore of uniform diameter, such as is required in pipes or tubes used for pump barrels or for similar purposes where a plunger or similar member must make a fluid tight fit therewith throughout its passage through the tube.

I aim to provide a device for testing the uniformity of the internal diameter of tubes so that inequalities therein may be detected and corrected.

It is an object to provide a method of testing such tubes through noting the amount of fluid leaking past a cylinder of uniform diameter moving within the tube.

In the drawing herewith, Fig. 1 illustrates an apparatus whereby my invention may be accomplished, shown partly in section.

Fig. 2 shows a different embodiment of the invention taken partly in central vertical section thereof.

In the Fig. 1 embodiment of the invention, I provide a tube or barrel 1 the interior diameter of which is to be tested. At one end of said tube, I screw a cap 2 closing that end, except for a lateral fluid inlet 3 in the cap. A stuffing box 4 centrally of the end of said cap allows the passage of a wire or other flexible line 5 without permitting the leakage of fluid about the line.

Within the tube, a uniformly calibrated cylindrical gauge or piston 6 is provided which fits somewhat loosely in the tube so as to allow a slight leakage of fluid about the same on all sides within the tube. Said piston is secured to the inner end of said line 5.

The line 5 is reeled upon a drum 7 outside the tube. Said drum is suitably mounted on a shaft 8 and means, much as the crank 9 on the shaft, are adapted to reel up or unreel said line. A brake drum on the reel has a brake band 10 thereon, the tension upon which is controlled by the weighted lever 11.

At the other end of the tube is connected, by means of the swaged nipple 12, a smaller pipe 13 having a diaphragm 14 transversely thereof, said diaphragm has a small orifice 15 therein limiting the speed of flow of fluid in the tube.

An orifice meter 16 of ordinary construction is connected with the pipe 13 adjacent the orifice so as to indicate the flow of fluid through the orifice.

In the operation of the device, the piston 6 is introduced into the tube, the line 5 connected therewith, and the cap 2 is then screwed in place and the orifice meter attached. The pressure fluid, preferably air, is introduced through the inlet 3 and exerts a continuous and constant pressure upon the piston 6 moving it through the tube and unreeling the line 5 from the reel 7.

Some fluid will escape past the piston and will pass through the orifice 15 and the amount of flow will be indicated upon the meter 16. As the piston travels slowly through the tube it may reach a point where the inner diameter of the tube is greater than the normal diameter. The result will be a greater flow of fluid past the piston and the greater flow will be indicated upon the meter. Likewise, in constricted places in the tube, the leakage of fluid past the piston will be decreased, and this change in flow past the piston will be indicated on the meter.

The operator will thus be enabled to note variations from the normal diameter of the tube at all points. The line 5 or the drum 8 may be provided with graduations to show the exact point where the variations occur so that the operator will have an accurate determination of the inner diameter of the tube for correction as desired.

In Fig. 2 the same principal is employed although the apparatus is different. I place the tube 1 in a well 17, said tube being suspended from its upper end by connection with a plate 18 adapted to rest upon the upper end of the well. Said plate has a central opening 19 and a downwardly axtending flange 20 about said opening, threaded to engage the upper end of the tube. The lower end of the tube is closed by a cap 21.

An adjacent well 22 of the same depth as well 17 serves to allow the movement therein of a weight 23 of smaller diameter than said well.

The tube 1 is preferably filled with liquid such as oil or water. A heavy piston 24 of uniform external diameter fits loosely in the tube to allow leakage of fluid past the piston.

The two weighted members 23 and 24 are connected by means of a line 25 which passes over pulleys 26 and 27 and beneath a small pulley 28 upon a meter 29. Said meter serves to indicate the speed of movement of said line 25 upon the pulley 28.

In this device, the apparatus will be assembled as shown in Fig. 2 and the piston 24 will be introduced into the upper end of the tube. Said piston is heavier than the weight 23 and will drop slowly through the liquid, the liquid below the piston passing between the piston and the inner wall of the tube as the plunger drops. Where the inner diameter of the tube is larger than normal, the piston will drop faster because of the larger passage for fluid about the piston. Where the internal diameter of the tube is constricted, the piston will slow down. The variations in speed will be indicated on the meter 29, so that the operator can determine accurately where the variations occur. The speed of movement of the piston is indicative of the speed of movement of liquid past the piston, the principal being the same as in the first embodiment.

Obviously, the inventive idea set out in the foregoing description is capable of embodiment in various forms and I do not wish to be restricted to the construction shown, it being understood that the device is capable of wide application.

What I claim as new is:

1. A device to test the inner gage of tubes comprising a gage piston formed to fit the tube loosely, an inlet adapted for attachment to said tube whereby pressure fluid may be impressed upon said piston to move said piston through said tube, and means adapted to be attached to the downstream end of said tube to indicate variations in the amount of fluid leaking past said piston.

2. A device to test the inner gage of tubes including a piston shaped to fit loosely within the tube so as to allow a passage of fluid past said piston in the tube, an inlet for fluid adapted for attachment to said tube whereby fluid pressure may be impressed upon said piston to move said piston in the tube, and an orifice meter adapted to be attached at the outlet end of said tube to indicate the relative amounts of fluid leaking past said piston.

3. A device to test the inner gage of tubes including a piston shaped to fit loosely within the tube so as to allow a passage of fluid past said piston in the tube, an inlet for fluid adapted for attachment to said tube whereby fluid pressure may be impressed upon said piston to move said piston in the tube, means to limit the speed of movement of said piston, and an orifice meter adapted to be attached at the outlet end of said tube to indicate the relative amounts of fluid leaking past said piston.

4. A device to test the inner gage of tubes including a piston shaped to fit loosely within the tube so as to allow a passage of fluid past said piston in the tube, an inlet for fluid adapted for attachment to said tube whereby fluid pressure may be impressed upon said piston to move said piston in the tube, a diaphragm adapted to be positioned across the outlet end of the tube, said diaphragm having an orifice therein, and an orifice meter adapted to be attached adjacent said diaphragm to indicate the relative amounts of fluid leaking past said piston.

5. A method of testing the internal diameter of tubes comprising moving a loosely fitting piston through said tube, noting the leakage of fluid past said piston as it is moved, and calculating variations in said diameter through the amount of leakage past said piston at different points in said tube.

6. A method of testing the internal diameter of tubes including moving a cylindrical member of smaller external diameter than the internal diameter of said tube through said tube, and noting the amount of fluid leaking past said member at each point throughout the length of said tube.

7. A method of testing the internal diameter of tubes comprising passing through said tube a piston of smaller external diameter than the internal diameter of the tube, causing liquid to pass between said piston and tube as said piston moves longitudinally therein, and noting the comparative speed of movement of said liquid and said plunger as an index of variations in the diameter of the tube.

HAROLD W. FLETCHER.